United States Patent [19]

Zürcher et al.

[11] Patent Number: 4,582,740
[45] Date of Patent: Apr. 15, 1986

[54] PROCESS FOR COVERING A SUBSTRATE WITH THREADS WELDED THROUGH THE USE OF ULTRASOUNDS, A MACHINE FOR THE APPLICATION OF THIS PROCESS AND A SUBSTRATE COVERED WITH THREADS WELDED ACCORDING TO THIS PROCESS

[75] Inventors: Erwin Zürcher, Le Lignon, Switzerland; Rémi Cottenceau, Viry, France

[73] Assignee: SIRS - Societe Internationale de Revetements de Sol S.A., Neuilly-sur-Seine, France

[21] Appl. No.: 674,732

[22] Filed: Nov. 26, 1984

Related U.S. Application Data

[62] Division of Ser. No. 525,050, filed as PCT CH 82/00125, Dec. 1, 1982, published as WO 83/01966, Jun. 9, 1983, § 102(e) date Aug. 3, 1983, Pat. No. 4,502,902.

[30] Foreign Application Priority Data

Dec. 3, 1981 [CH] Switzerland ..................... 7728/81

[51] Int. Cl.⁴ .................... B32B 5/08; D04H 11/04
[52] U.S. Cl. ........................................ 428/88; 156/72; 156/73.2; 156/178; 428/94
[58] Field of Search ............. 156/72, 73.2, 178; 428/88, 93, 94

[56] References Cited

U.S. PATENT DOCUMENTS

| | | | |
|---|---|---|---|
| 2,752,277 | 6/1956 | Keen | 428/93 |
| 2,884,680 | 5/1959 | Nowicki | 428/93 |
| 3,640,786 | 2/1972 | Carpenter | 156/72 |
| 3,850,783 | 11/1974 | Peters et al. | 156/72 |
| 3,982,978 | 9/1976 | Carpenter | 156/73.2 |

*Primary Examiner*—Michael Wityshyn
*Attorney, Agent, or Firm*—Karl F. Ross; Herbert Dubno

[57] ABSTRACT

A machine for producing pile fabric comprises a sonotrode (1), a matrix (4) of tubes (5) bringing threads (10) onto a support sheet (7) for the purpose of welding rows of loops to the surface of this sheet. The matrix (4) is guided between slides (6) which are parallel to the longitudinal axes of the tubes (5) and perpendicularly to the surface of application of the sonotrode (1) vibrations. A driving mechanism (13, 14, 15) periodically brings the extremities of the tubes (5) from which the threads leave against the sonotrode (1) by pressing the base of a row of loops and the support sheet (7) against the sonotrode in order to cause them to be welded together.

2 Claims, 11 Drawing Figures

PROCESS FOR COVERING A SUBSTRATE WITH THREADS WELDED THROUGH THE USE OF ULTRASOUNDS, A MACHINE FOR THE APPLICATION OF THIS PROCESS AND A SUBSTRATE COVERED WITH THREADS WELDED ACCORDING TO THIS PROCESS

CROSS REFERENCE TO RELATED APPLICATIONS

This application is a division of copending application Ser. No. 525,050 filed as PCT CH82/00125, Dec. 1, 1982, published as WO 83/01966, Jun. 9, 1983, § 102(e) date Aug. 3, 1983, now U.S. Pat. No. 4,502,902, as a national phase application of international application PCT/CH82/00125 filed Dec. 1, 1982 and benefiting from the priority of Swiss national application 7728/81-9 filed Dec. 3, 1981.

FIELD OF THE INVENTION

This invention relates to a pile fabric produced by a process for covering a substrate comprising threads welded by ultrasounds, these threads and this substrate being made, at least partially, of thermoplastic material; such process and a machine for the practical application thereof form the subject matter of our aforementioned application Ser. No. 525,050.

BACKGROUND OF THE INVENTION

The production of pile fabric has already been proposed in Swiss Pat. No. 580 496 by a process wherein a sheet of parallel threads is conformed in succession in rows of loops fastened progressively to the surface of a support by causing the material of the threads and of the support to melt locally in their zone of contact by pinching them between a bearing surface and a sonotrode set into acoustic vibration at a frequency and amplitude which can cause the melting of the thermoplastic material. According to this process, the sheet of threads is pleated using a mechanism having an alternating motion superimposed on the defilading motion of the support. This mechanism comprises a matrix provided with a multiplicity of tubes guiding the threads, which are aligned in a crosswise direction with respect to the direction of defilading motion of the support and which are mounted so as to move in a back and forth motion in a plane perpendicular to that of the relative motion between the welding sonotrode and a welding bearing surface so as to form a series of successive parallel loops mounted on the support the bases of which are welded progressively onto the surface of this support in the zones thereof adjacent to that support.

One of the main drawbacks of this system is the nature of the alignment of the rows of loops on the support which is not desirable in the case of a rug because it give rise to a less satisfactory covering power of the support and makes the junctions more difficult to effect because if the rows are not placed perfectly in line with one another, the junction line becomes extremely distinct. This invention aims at correcting, at least partially, the above mentioned drawbacks.

SUMMARY OF THE INVENTION

To this effect, the object of this invention is first the provision of a pile fabric by a process designed to cover a substrate with threads welded in place by ultrasound, these threads and this substrate being at least partially made of thermoplastic material, wherein this substrate is placed opposite a welding sonotrode, parts of said threads are brought into contact with that part of the substrate placed opposite this sonotrode, these parts of the substrate and threads are pressed into contact against the sonotrode connected to a source of energy so that variations in ultrasonic pressures are transmitted to them which can create between them a localized fusion and this pressure is released in order to displace the substrate and effect the welding of another part of these threads onto another part of the surface thereof and so on until the substrate has been covered. This process is characterized by the fact that the sonotrode is placed in a position adjacent to the reverse of the substrate, each of said threads is passed through a guiding duct the outlet extremity of which is adjacent to a receiving obverse surface facing away from the sonotrode, these guiding ducts are given alternating motions along a direction which is substantially perpendicular to the vibration transmission face of the sonotrode and these bearing surfaces are periodically brought into elastic contact with the obverse part of the substrate passing over said vibration transmission face of the sonotrode so that this part of the substrate and that of each of said threads leaving the respective extremities of said ducts are applied against said sonotrode.

In the production of pile fabric according to this invention, a machine for carrying out the process described in our prior application comprises means for advancing the substrate, a matrix of guiding ducts for these threads, this matrix of guiding ducts being located in a crosswise direction with respect to the direction of advance of this substrate and being in meshing engagement with guiding means defining a translation of this matrix and with driving means designed to impart to it a back and forth motion with respect to the guiding means and bring in succession the outlet extremities of the guiding ducts near a part of the substrate, and a welding station comprising a sonotrode and bearing means which are located on either side of this part of the substrate, and means for energizing this sonotrode so as to cause it to vibrate at an acoustic frequency which will heat the thermoplastic material to its melting temperature when it is pressed between this sonotrode and these means of support, characterized by the fact that these translation guiding means are oriented perpendicularly with respect to the surface of application of the acoustic vibrations of the sonotrode and that said bearing means are made of bearing surface located in the immediate vicinity of the outlet extremities of said respective guiding ducts which are mounted onto said matrix by means of elastic suspension components acting at least in the direction of stroke of the matrix bringing these bearing surfaces against the sonotrode vibration transmission surface.

Thus, our invention produces a pile fabric having a substrate covered with threads welded by ultrasound obtained in accordance with the process of our prior application.

The advantage of that process is that it makes it possible to individually choose the welding areas for each thread on the substrate, which is not possible with the conventional process designed to only produce loops that are aligned in a crosswise direction with respect to the substrate. The process according to our prior application makes it possible, therefore, to obtain a pile-fabric product the appearance of which is particularly pleasant and which does not differ in any way from the usual "tufted" rug, but which makes it possible, in relation to the "tufted" rug, to effect a substantial economy of raw material which can be evaluated at approximately 20% of thread. The process is not limited to moquette rugs alone. It is possible to cover substrates with threads in order to produce wall coverings or for all sorts of applications, for example, in the field of geotextiles. In this respect, the term threads used in this disclosure is not limited to the thread obtained by the spinning of cut fibers, but also to extruded and textured filaments, horsehairs or monofilaments of large diameter, for example, of the order of a millimeter.

BRIEF DESCRIPTION OF THE DRAWING

The appended drawing illustrates very schematically, and by way of example, an embodiment and variations of machines for the production of pile fabric according to the invention. In the drawing.

SPECIFIC DESCRIPTION

Figure 1:
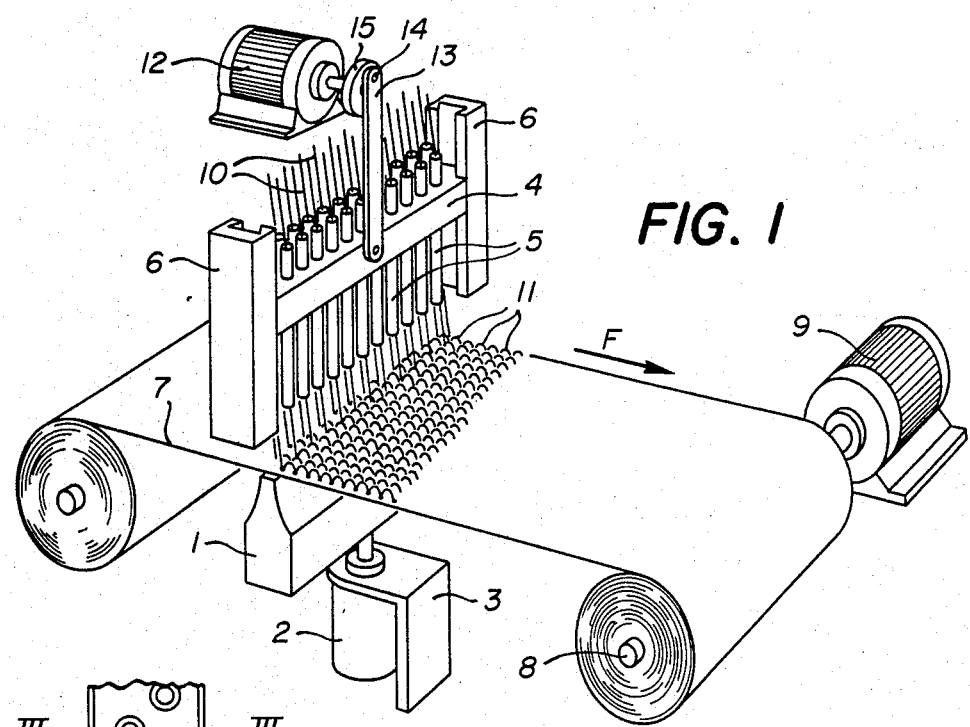
FIG. 1 is a perspective view of an embodiment of a machine for making pile fabric according to the invention.
Figure 3:
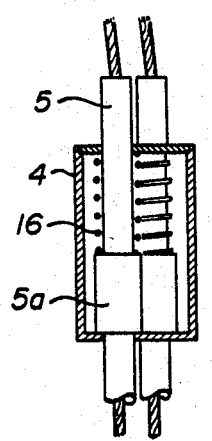
FIG. 3 is a sectional view along line III—III of FIG. 2.

The machine illustrated in FIG. 1 comprises a sonotrode 1 connected to a vibration generator 2 which includes a transducer (not shown) the entire assembly being supported by a stationary beam 3. A matrix 4 of tubes 5 is slidingly mounted between two parallel slides 6, the longitudinal axes of the tubes extending in a direction parallel to slides 6 and perpendicularly to a substrate made of a supporting sheet 7, consisting generally of a nonwoven cloth or a cloth made, at least partially, of a thermoplastic material, on which loops are to be welded in order to provide a rub of the moquette type. A receiving roller 8 associated with a driving motor 9 provides for the advance of the support sheet 7 between sonotrode 1 and the outlet extremities of the tubes, in the direction of arrow F. The inlet extremities of these tubes 5 receive the respective threads 10 which are to form loops 11 on the surface of the support sheet 7. These threads 10 are at least partially made of a thermoplastic material and come from feeding spools (not shown). As illustrated in FIG. 3, each tube 5 has a collar 5a located on the inside of matrix 4, and a spring 16, bearing against this collar 5a and against the upper wall of matrix 4, presses elastically tubes 5 in the direction of support sheet 7. These springs 16 are calibrated to ensure uniform pressures over all the welded threads 7 at the same time.

Figure 2:
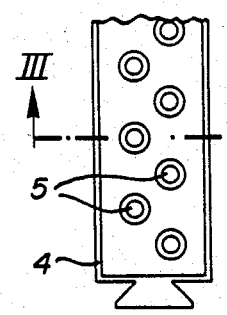
FIG. 2 is a plan view of a detail of FIG. 1.

The matrix 4 of tubes is connected to a driving motor 12 by means of a connecting rod 13 one extremity of which is hinged to the center of matrix 4 and the other extremity of which is hinged to an eccentric 14, integral with a driving wheel 15, wedged onto the output shaft of motor 12. The tubes are preferably fastened in matrix 4 so that they are not all aligned on one and the same crosswise axis with respect to the advance direction of support sheet 7 as seen, in particular, in FIG. 2. Since the welding of the respective threads results from the clamping of these threads between the edge of the outlet extremity of each tube and support sheet 7, which is itself clamped against sonotrode 1 which communicates its vibrations to them, the loops 11, as a result, will be staggered with respect to one another in the crosswise direction exactly in accordance with the arrangement of the tubes 5 on matrix 4. The arrangement shown in FIG. 2 is of course in no way limiting and others can of course be chosen.

The cycle of formation of fastening of a row of loops 11 comprises the uplifting of matrix 4 of tubes 5 by means of the connecting rod 13. As a result, there is a sliding of tubes 5 with respect to the respective threads previously welded onto support sheet 7. Subsequently, matrix 4 of tubes 5 returns towards this support sheet 7 which has advanced by one spacing corresponding to the spacing of the extremities of loops 11, connected to the support sheet and applies elastically the outlet extremities of these tubes 5, the stroke of matrix 4 being slightly greater than the distance separating the outlet extremities of the tubes from support sheet 7, with the difference being absorbed by the springs 16 associated with tubes 5. This makes it possible to ensure the contact between the thread 10 to be welded, that part of the support sheet 7 to which thread 10 is welded and sonotrode 1, for a fraction of a second which is sufficient to obtain the welding between the support sheet 7 and thread 10 through the application of ultrasonic vibrations communicated by sonotrode 1. This time interval, which can range from several hundredths to several tenths of a second, and the pressure can be adjusted by adapting the pressure of the spring and the stroke of the tubes 5, this being done, in particular, as a function of the nature of the titre of the threads or of the elemental filaments as well as of the nature of the substrate.

Figure 4:
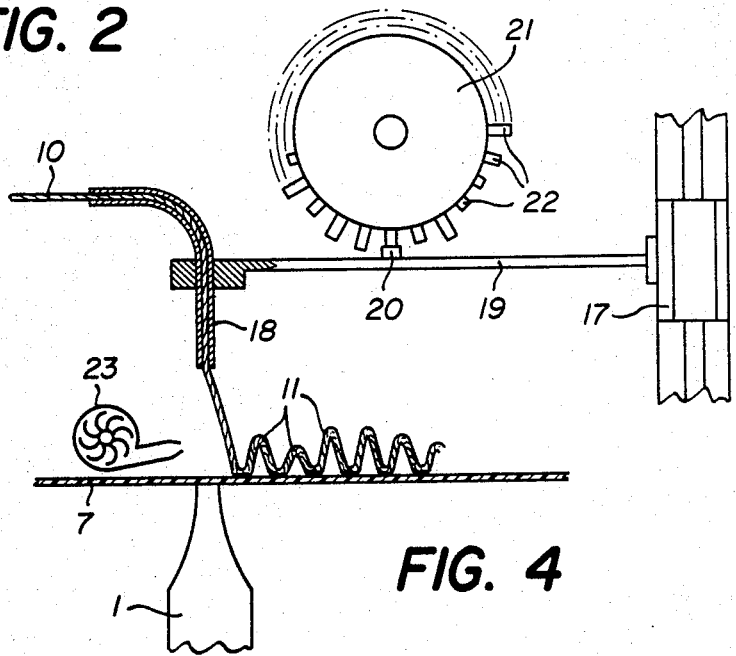
FIG. 4 is a lateral elevational view of a variation on the machine of FIG. 1.

The varying embodiment illustrated in FIG. 4 shows a matrix 17 of tubes 18 each connected to the matrix 17 by means of an elastic arm 19 which has a bearing component 20 extending perpendicularly to the longitudinal axis of the elastic arm 19, in a direction parallel to the sliding direction of matrix 17. A rotating selection member 21, provided with a series of radial blades 22, of different lengths, is connected to the driving mechanism of the machine (not shown) so that it can advance by one spacing at each turn of the driving wheel of matrix 17. Such a driving wheel corresponds to wheel 15 of FIG. 1.

A fan 23 is placed opposite the path which thread 10 forms between the outlet of tubes 18 and support sheet 7. This fan acts to guarantee that the loops of thread 11 always form in the same direction in the downward stroke of tube 18. In the ascending stroke of the alternating motion of matrix 17, thrust bearings 20 meet the radial blades 22, thus limiting the stroke of the respective tubes 18 and, as a result, the extent of the sliding between tubes 18 and the respective threads 10. As a result, when tubes 18 are brought back in the direction of support sheet 7 in order to form loops 11, the value of the sliding between these tubes and threads 10 defines the height of loops 11. Through adequate programming of each individual tube 18, it is possible to obtain raised patterns on the surface of support sheet 7. This constitutes an additional advantage of the machine according to the invention, since the moquette with raised patterns constitutes a substantial proportion of the market. The very great simplicity of the means of application is to be noted in spite of the fact that the machine according to the invention shows substantial improvements in comparison with those of the state of the art. It is of course also possible to use mechanisms currently employed to produce loops of different heights with the "tufting" machines such as, for example, the photoelectric reading mechanisms.

Figure 5:
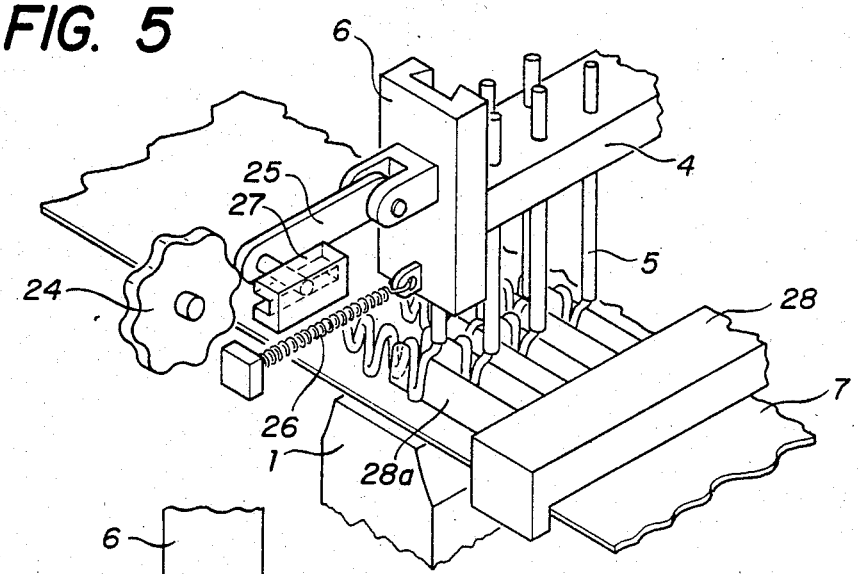
FIG. 5 is a perspective view of another embodiment.

The varying embodiment illustrated in FIG. 5 relates to a mechanism according to which the matrix 4 of tubes 5 not only has a back and forth vertical motion as in the case of FIG. 1 but also a crosswise back and forth motion with respect to substrate 7. To this effect, a circular cam 24 is rotatingly mounted around an axis parallel to the longitudinal axis of substrate 7. A feeler 25 is applied against this can 24 by a spring 26. This feeler is hinged to slide 6 and its extremity close to cam 24 is guided in a rail 27 extending horizontally in a direction crosswise to substrate 7. Circular cam 24 is synchronized by transmission means (not shown) with connecting rod 13 (shown in FIG. 1) so as to cause the crosswise displacement of slide 6 alternately in one direction and then in the other between two successive welds of one and the same thread.

Figure 8:
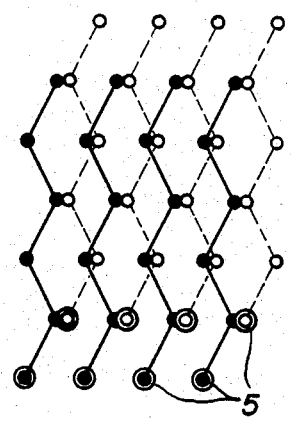
FIGS. 8 and 9 are plan views of pile-fabric products obtained through the use of the embodiment of FIG. 5.
Figure 9:
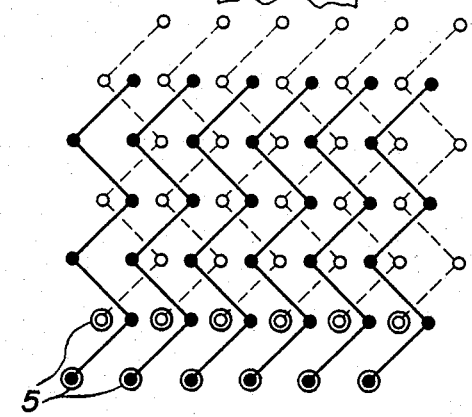

A comb 28 is placed in a crosswise direction with respect to substrate 7 with teeth 28a made of vertical lamellae the spacing of which corresponds to that of tubes 5 of matrix 4. These teeth 28a are in the middle of the crosswise stroke of each tube so that the weld of a given thread occurs alternately on either side of a given tooth 28. This varying embodiment makes it possible to provide varied patterns in accordance with the arrangement of tubes 5, the amplitude of the crosswise displacement and the relative speed of the substrate. Two examples of these patterns are illustrated in FIGS. 8 and 9. In these figures, the arrangement in double rows of the matrix of tubes 5 is shown in thick lines at the beginning and the threads originating from the tubes of both rows are shown in continuous, respectively interrupted, lines. The comb illustrated in FIG. 5 can of course be used with the mechanism of FIG. 1, the teeth of the comb then being used to prevent the loops of a longitudinal line from overlapping into the adjacent lines.

It should further be pointed out that it is also possible to use the process described, in particular, the varying embodiment of FIG. 5, to fasten threads into a substrate without forming loops but by constantly maintaining the threads against the substrate. This this effect, the teeth 28a of comb 28 are simply eliminated and the amplitude of the vertical motion of matrix 4 is made to coincide with the forward motion of the substrate so that the threads are pulled in a direction parallel to the surface. Using this technique, it is possible to provide, for example, wall coverings.

Figure 6:
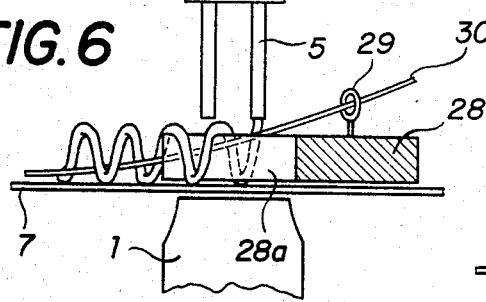
FIG. 6 is a partial elevational view of still another embodiment.

FIG. 6 shows another varying embodiment of FIG. 5. Slide 6, tubes 5, comb 28 with its teeth 28a, substrate 7 and sonotrode 1 can be recognized in this varying embodiment. Comb 28 has eyelets 29 designed to guide threads 39 which are inserted longitudinally below the loops formed by the crosswise motion of tubes 5 on either side of teeth 28a.

Figure 7:
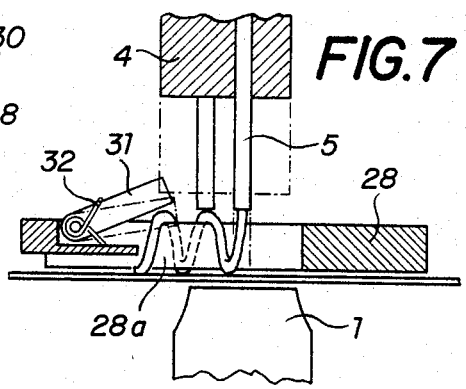
FIG. 7 is a partial elevational view of a machine for making pile fabric showing other principles of the invention.

FIG. 7 illustrates a varying embodiment in which the loops are formed above the teeth 28a of a comb 28 as in the case of FIG. 5. Each tooth 28a of this comb has a knife 31 associated with a return spring 32. Each time the matrix 4 of tubes 5 goes down in order to place a thread into contact with substrate 7 and sonotrode 1, the knife 31 is lowered and cuts the loop of the thread previously formed above tooth 28a.

The trials carried out using the process according to the invention have shown that it is possible to weld various thermoplastic materials together. For example, a polypropylene substrate with a polypropylene thread, a polyamide 6 substrate with a polyamide 6 thread and a polyamide 6 thread with a polypropylene thread. The important factor is of course the nature of the material being used directly in the welding. This of course does not prevent the use of two-component filaments comprising a polyamide 6 sleeve and a polyester core such as those existing on the market. Similarly, it is also possible to cover one face with a non-thermoplastic material such as jute canvas cloth with a coating of a thermoplastic material appropriate to the thread which is to be welded to the surface thereof. It is also possible to coat a substrate of a thermoplastic material with a thermoplastic material of the same type or of a different type and having a good affinity with the thread to be welded. Thus, it is possible to apply a powdered material onto a non woven substrate, for example, in order to increase the thickness of that substrate.

Although patterns are shown in FIGS. 8 and 9 that were obtained using matrices wherein tubes are distributed over two parallel rows crosswise with respect to the substrate, in order to obtain the crossing of threads, it is of course possible to obtain patterns using one or more independent matrices with a single row of tubes having alternating motions in a direction crosswise to the direction of advance of the substrate, so that broken lines are formed.

When welding threads made of extruded multifilaments through a multiple nozzle die, threse filaments, since they are not tied to one another as in a thread obtained through spinning, may more or less spread out at the welding site. It has been noted that the welds of multifilament threads effected using the embodiments of machines illustrated in FIGS. 1 to 7 have a good tensile strength, of the order of 6 mN; however, their behavior is much less satisfactory with respect to the "boulochage" test after which it is noted that a substantial proportion of the filaments have been torn away. Such a fault makes the product obtained practically unsuitable for floor coverings.

Different trials were carried out to try to correct this drawback. Thus, the longitudinal axis of the tubes was inclined with respect to the sonotrode 1. When this inclination was chosen so that the part of the edge of the tube on which the thread passes as it leaves, touches the substitute first, an increase in the tensile strength of the weld was noted, but with no change in the "boulochage" effect. By imparting to this tube an inclination that was symmetrical with respect to the vertical, the tensile strength decreased and the "boulochage" effect remained substantial.

Microscopic examination of the weld shows that by using the edge of the tubes 5 as a bearing surface in order to apply the threads against substrate 7 and sonotrode 1, the shape of the annular sector of this bearing surface prevents the spreading out of the thread filaments which, as mentioned before, are more or less free, the texturation of the thread alone uniting them but with a certain degree of freedom. As the thread leaves the tube by bearing against a concave surface and the bearing surface at the time of welding consists of an annular sector of the tube extremity, delimited exactly by this concave surface, this form induces a concentration of filaments on the bearing surface. As a result of this concentration of filaments, since the thread can be likened to a crushed cylinder, there are more filaments in the center of the annular sector defining the weld than on the edges thereof. Consequently, the thickness of material is greater at the center of this annular sector than on the edges of that sector. Therefore, the pressure is unequal and, in particular, the filaments located near the edges of that sector are welded in a less satisfactory manner to the substrate which gives rise to the significant "boulochage" effect noted in spite of the satisfactory strength of the weld itself, tested by applying a tractive force on the thread as a whole.

Figure 10:
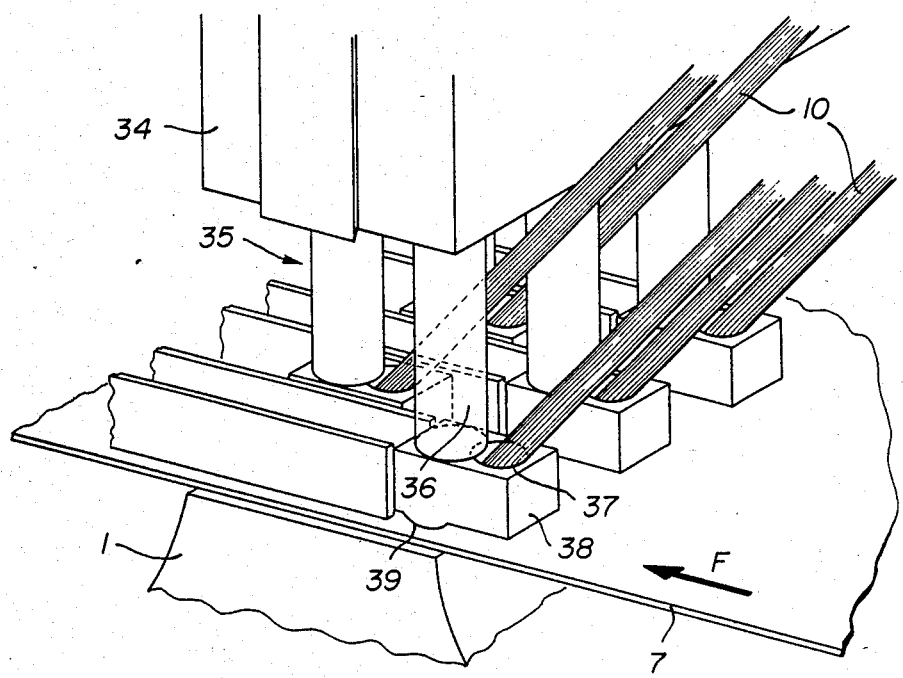
FIG. 10 is a partial perspective view of a further embodiment.
Figure 11:
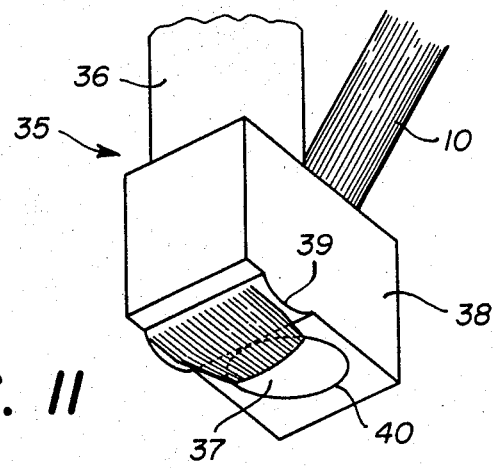
FIG. 11 is a perspective view of a detail of FIG. 10 enlarged from a different angle.

It is this fault, in particular, which the varying embodiment illustrated in FIGS. 10 and 11 proposes to correct. This varying embodiment comprises a matrix 34 provided with a series of thread guides 35 located alternately on two rows crosswise with respect to the longitudinal axis of substrate 7. These thread guides 35 play the same role as tubes 5 of the preceding embodiments. They each have a cylindrical guiding rod 36 slidingly mounted in matrix 34 and elastically pressed by a spring (not shown) as illustrated in FIG. 3. Simply, in this case, thread 10 does not go through rod 34, but through a duct 37 which crosses a parallelepipedic block 38 fastened at the lower extremity of the guiding rod 36. Each of the parallelepipedic blocks 38 is located between two teeth 28a of the above mentioned comb. The lower face of each parallelepipedic block 38 has a rectilinear ridge 39 located in a direction crosswise to the direction of defilading F of substrate 7 substantially tangent to the edge of the outlet opening 40 of duct 37 in the lower face of the parallelepipedic block 38, and upon following up this outlet opening 40 of duct 37 with respect to the direction of defilading F of substrate 7. This ridge 39 has, preferably, the shape of a semiellipse, the major axis of which is parallel to the lower face of block 38. It is also possible to use a ridge with a plane face edged longitudinally with two circle arcs.

This rectilinear ridge 39 constitutes the bearing surface of thread 10 when this thread is being welded against substrate 7, through application of parts of the thread and of the substrate to be welded against sonotrode 1. As can be noted by examining FIG. 11, the multifilament thread 10 coming out of duct 37 while bearing against the concave surface formed by a sector of outlet opening 40, passes immediately on the rectilinear ridge 39 which imparts to thread 10 a convex inflextion. Furthermore, since this ridge 39 is rectilinear, the filaments of thread 10, which have a certain degree of freedom between them since they are not twisted into a helix, can spread out along this rectilinear ridge 39. The best distribution of the filaments on ridge 39, which constitutes the bearing surface when thread 10 is welded onto substrate 7, makes it possible to render the weld more homogeneous and to thus substantially use the "boulochage" effect. This varying embodiment is therefore particularly valuable for the production of rugs of the moquette type the wear of which comes about essentially through this "boulochage" phenomenon. Furthermore, this varying embodiment has all the other above mentioned advantages of the invention.

We claim:

1. A pile fabric comprising a web substrate and a multiplicity of transversely spaced continuous threads in an undulating pattern having each a longitudinally extending row of loops upstanding from said substrate alternating with loops in contact with said substrate and ultrasonically welded to said substrate only at the points at which the alternate loops contact said substrate, the loops upstanding from said substrate forming the pile of the fabric and substantially covering the surface of said substrate to which said threads are welded, said rows being parallel to one another with the loops and contact points of each row being staggered in the longitudinal direction with respect to the loops and contact points of other rows transversely across the substrate.

2. The pile fabric defined in claim 1 wherein the upstanding loops of each row are of different heights along the row.

* * * * *